(12) United States Patent
Chuong et al.

(10) Patent No.: US 11,629,645 B2
(45) Date of Patent: Apr. 18, 2023

(54) HYDROSTATIC SEAL WITH EXTENDED CARRIER ARM

(71) Applicant: United Technologies Corporation, Farmington, CT (US)

(72) Inventors: Conway Chuong, Manchester, CT (US); Shane R. Sylvester, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 691 days.

(21) Appl. No.: 16/535,755

(22) Filed: Aug. 8, 2019

(65) Prior Publication Data

US 2021/0040891 A1 Feb. 11, 2021

(51) Int. Cl.
*F02C 7/28* (2006.01)
*F01D 11/00* (2006.01)
*F16J 15/16* (2006.01)

(52) U.S. Cl.
CPC ............. *F02C 7/28* (2013.01); *F01D 11/001* (2013.01); *F16J 15/164* (2013.01)

(58) Field of Classification Search
CPC ........ F01D 11/00; F01D 11/001; F01D 11/02; F16J 15/164
See application file for complete search history.

(56) References Cited

U.S. PATENT DOCUMENTS

| 4,405,134 A * | 9/1983 | Sargent .................. F16J 15/441 |
| | | 277/422 |
| 8,408,556 B2 | 4/2013 | Vasagar et al. |
| 10,119,474 B2 | 11/2018 | Hyland et al. |
| 10,316,974 B2 | 6/2019 | Webster et al. |
| 2009/0028712 A1* | 1/2009 | Weidmann ............ F01D 11/001 |
| | | 416/220 R |
| 2016/0376904 A1 | 12/2016 | Schwarz et al. |
| 2018/0252317 A1 | 9/2018 | Prenger et al. |
| 2018/0355756 A1* | 12/2018 | Ackermann ............ F01D 11/04 |
| 2019/0093496 A1 | 3/2019 | Hardikar et al. |

FOREIGN PATENT DOCUMENTS

| EP | 3156592 A1 | 4/2017 |
| GB | 2092242 A | 8/1982 |
| WO | 2014143284 A1 | 9/2014 |

OTHER PUBLICATIONS

European Search Report for European Application No. 20178102.8; dated Sep. 14, 2020; 9 pages.

* cited by examiner

*Primary Examiner* — Topaz L. Elliott
*Assistant Examiner* — Cameron A Corday
(74) *Attorney, Agent, or Firm* — Cantor Colburn LLP

(57) ABSTRACT

A hydrostatic seal assembly includes a primary seal assembly configured to maintain a selected gap between the primary seal and a rotating component, and a seal carrier. The seal carrier includes a radial outer wall, an axial wall extending from the radial outer wall at a first axial end of the radial outer wall, and a carrier arm extending from the radial outer wall at a second axial end of the radial outer wall opposite the first axial end. The carrier arm is secured to a static structure for sealing between the rotating component and the static structure.

17 Claims, 4 Drawing Sheets

HYDROSTATIC SEAL WITH EXTENDED CARRIER ARM

STATEMENT OF FEDERAL SUPPORT

This invention was made with Government support awarded by the United States. The Government has certain rights in the invention.

BACKGROUND

Exemplary embodiments pertain to the art of gas turbine engines, and more particularly to seal assemblies for gas turbine engines.

In a gas turbine engine, a number of components rotate under tight tolerances about an engine central longitudinal axis relative to static components. For example, the compressor and turbine sections of the gas turbine engine include rotating rotors with rotor blades extending radially outward. The rotor rotates relative to a stator with a small annular gap therebetween. To increase efficiency of the gas turbine engine, it is important that such small gaps be maintained to limit leakage through the gap, but to also allow for rotation of the rotor relative to the stator.

Seals are often utilized to manage leakage through the gaps. Such seals are typically fixed to static components and may be contact seals, such as labyrinth or brush seals, while others may be non-contact seals such as hydrostatic seals. Some hydrostatic seals are configured with a shoe having radial travel in response to a pressure differential across the seal.

A hydrostatic seal typically includes a seal carrier, which holds the internal seal components together and in place for assembly into the engine. Depending on thermal properties and hardware configuration of the gas turbine engine, the hydrostatic seal may be subject to high stresses during transient operating conditions as components thermally expand into one another.

BRIEF DESCRIPTION

In one embodiment, a hydrostatic seal assembly includes a primary seal assembly configured to maintain a selected gap between the primary seal and a rotating component, and a seal carrier. The seal carrier includes a radial outer wall, an axial wall extending from the radial outer wall at a first axial end of the radial outer wall, and a carrier arm extending from the radial outer wall at a second axial end of the radial outer wall opposite the first axial end. The carrier arm is secured to a static structure for sealing between the rotating component and the static structure.

Additionally or alternatively, in this or other embodiments the radial outer wall, the axial wall and the carrier arm are formed as a single unitary component.

Additionally or alternatively, in this or other embodiments the carrier arm extends from the radial outer wall at an angle of between −45 degrees and 45 degrees.

Additionally or alternatively, in this or other embodiments a carrier flange extends from the carrier arm. The seal carrier is secured to the static structure via the carrier flange.

Additionally or alternatively, in this or other embodiments the carrier flange extends radially outwardly from the carrier arm.

Additionally or alternatively, in this or other embodiments the carrier flange is secured to the static structure via one of a bolted or snap connection.

Additionally or alternatively, in this or other embodiments the carrier arm extends axially forward of the primary seal.

In another embodiment, a turbine section of a gas turbine engine includes a turbine stator, a turbine rotor configured to rotate about an engine central longitudinal axis relative to the turbine stator, and a hydrostatic seal assembly fixed to the turbine stator. The hydrostatic seal includes a primary seal assembly configured to maintain a selected gap between the primary seal and the turbine rotor, and a seal carrier. The seal carrier includes a radial outer wall, an axial wall extending from the radial outer wall at a first axial end of the radial outer wall, and a carrier arm extending from the radial outer wall at a second axial end of the radial outer wall opposite the first axial end. The carrier arm is secured to the turbine stator for sealing between the turbine rotor and the turbine stator.

Additionally or alternatively, in this or other embodiments the radial outer wall, the axial wall and the carrier arm are formed as a single unitary component.

Additionally or alternatively, in this or other embodiments the carrier arm extends from the radial outer wall at an angle of between −45 degrees and 45 degrees.

Additionally or alternatively, in this or other embodiments a carrier flange extends from the carrier arm. The seal carrier is secured to the turbine stator via the carrier flange.

Additionally or alternatively, in this or other embodiments the carrier flange extends radially outwardly from the carrier arm.

Additionally or alternatively, in this or other embodiments the carrier flange is secured to the turbine stator via one of a bolted or snap connection.

Additionally or alternatively, in this or other embodiments the carrier arm extends axially forward of the primary seal.

In yet another embodiment, a gas turbine engine includes a combustor and a turbine section in fluid communication with the combustor. The turbine section includes a turbine stator, a turbine rotor configured to rotate about an engine central longitudinal axis relative to the turbine stator, and a hydrostatic seal assembly fixed to the turbine stator. The hydrostatic seal assembly includes a primary seal assembly configured to maintain a selected gap between the primary seal and the turbine rotor, and a seal carrier including a radial outer wall, an axial wall extending from the radial outer wall at a first axial end of the radial outer wall, and a carrier arm extending from the radial outer wall at a second axial end of the radial outer wall opposite the first axial end. The carrier arm is secured to the turbine stator for sealing between the turbine rotor and the turbine stator.

Additionally or alternatively, in this or other embodiments the carrier arm extends from the radial outer wall at an angle of between −45 degrees and 45 degrees.

Additionally or alternatively, in this or other embodiments a carrier flange extends from the carrier arm. The seal carrier is secured to the turbine stator via the carrier flange.

Additionally or alternatively, in this or other embodiments the carrier flange extends radially outwardly from the carrier arm.

Additionally or alternatively, in this or other embodiments the carrier flange is secured to the turbine stator via one of a bolted or snap connection.

Additionally or alternatively, in this or other embodiments the carrier arm extends axially forward of the primary seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
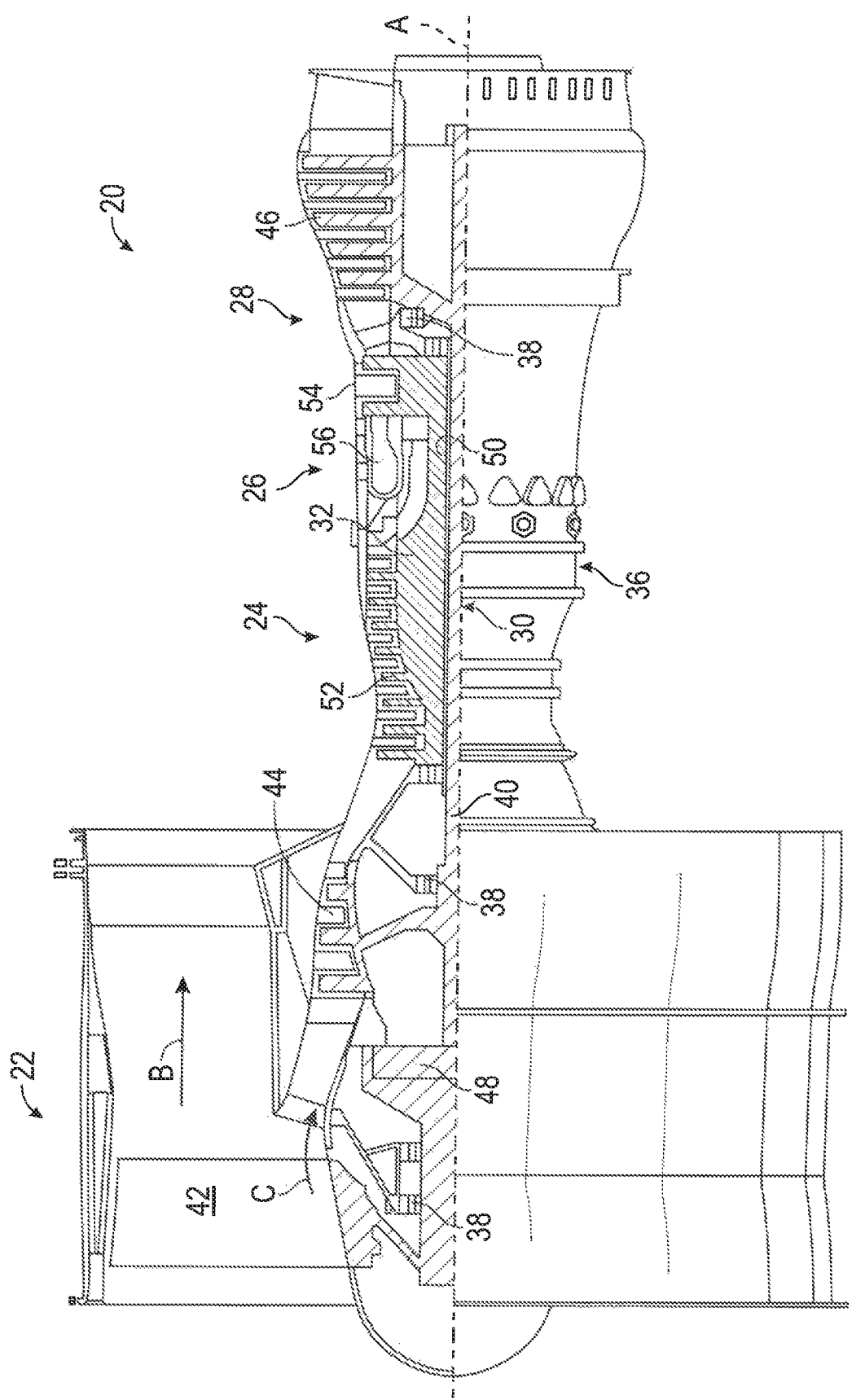
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including, for example, one spool or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
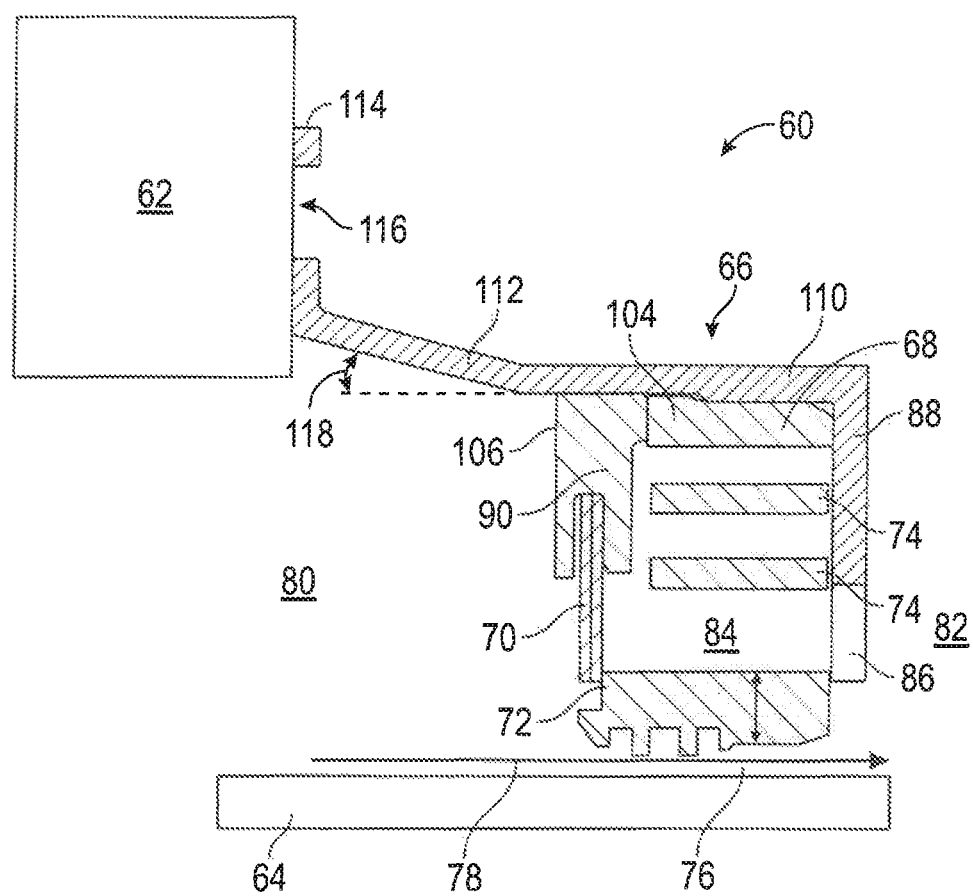
FIG. 2 is a cross-sectional view of an embodiment of a hydrostatic seal assembly for a gas turbine engine.

Referring now to FIG. 2, an embodiment of a seal 60 between a turbine stator 62 and a turbine rotor 64 is shown. The turbine rotor 64 is configured to rotate about the engine central longitudinal axis A relative to the turbine stator 62. While the description herein relates to sealing between a turbine stator and a turbine rotor, one skilled in the art will readily appreciate that the present disclosure may be readily applied at other locations of the gas turbine engine to provide sealing between a rotating component and a stationary component.

Figure 3:
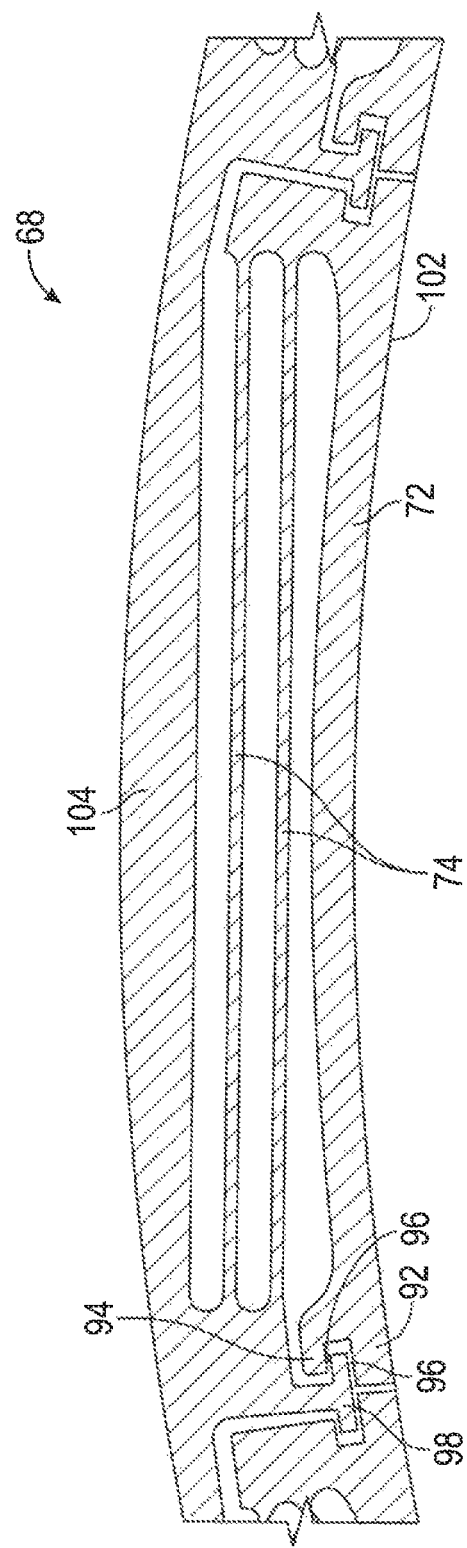
FIG. 3 is another cross-sectional view of an embodiment of a hydrostatic seal assembly for a gas turbine engine.

The seal 60 is fixed to the turbine stator 62 via a seal carrier 66 and includes a primary seal 68 and one or more secondary seals 70. The primary seal 68 includes a seal support 104, which supports a seal shoe 72 via one or more seal beams 74 which, as shown best in FIG. 3, are configured as spring elements integral with the seal support 104 and the seal shoe 72. Referring again to FIG. 2, the seal shoe 72 is radially moveable relative to the seal support 104, and radially toward the turbine stator 62 and radially away from the turbine stator 62 to maintain a desired air gap 76 between the turbine rotor 64 and the seal shoe 72.

In operation, an airflow 78 flows through the air gap 76 from a high pressure area 80 upstream of the seal 60 toward a low pressure area 82 downstream of the seal 60. Further, airflow enters a seal cavity 84 radially outboard of the seal shoe 72 via one or more plate openings 86 in an axial wall, for example aft wall 88 of the seal carrier 66, which is downstream of the seal shoe 72 and in some embodiments axially abuts the seal shoe 72. The secondary seals 70 are located upstream of the seal shoe 72 and in some embodiments abut the seal shoe 72. The secondary seal 70 prevents airflow from entering the seal cavity 84 from the high pressure area 80 and/or prevents airflow from exiting the seal cavity 84 via an upstream side of the seal 60. In some embodiments, the secondary seals 70 are axially retained at the seal shoe 72 by a secondary seal cover 106 upstream of the secondary seals 70. Further, a radial position of the secondary seal 70 may be maintained by a spacer 90. The seal shoe 72 moves radially until a pressure equilibrium between the air gap 76 and the seal cavity 84 is reached.

Referring again to FIG. 3, the primary seal 68 has a plurality of circumferentially spaced and segmented seal shoes 72. The radial travel or movement of the seal shoes 72 is limited by features of the primary seal 68. For example, the seal shoe includes a radially inboard stop 92 and a radially outboard stop 94 separated by an arm gap 96. A seal shoulder 98 of the primary seal 68 is disposed in the arm gap 96. Radial clearance between the seal shoulder 98 and the radially inboard stop 92 limits radially outward travel or movement of the seal shoe 72, while radial clearance between the seal shoulder 98 and the radially outboard stop 94 limits radially inward travel or movement of the seal shoe 72.

Figure 4:
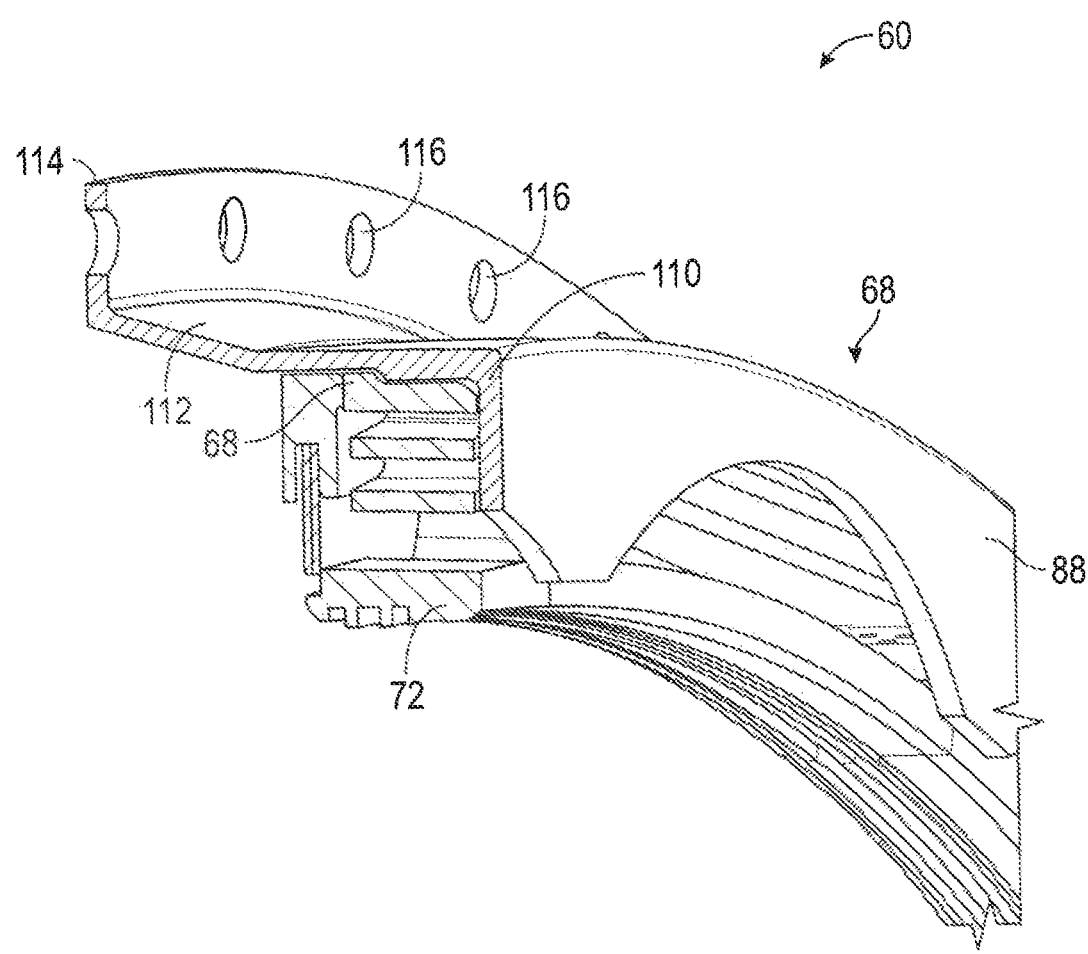
FIG. 4 is a partial perspective view of an embodiment of a hydrostatic seal assembly.

Referring again to FIG. 2, the seal carrier 66 includes the aft wall 88, a radially outer wall 110 extending from the aft wall 88 to radially retain the primary seal 68, and carrier arm 112 extending forward from the radially outer wall 110. It is to be appreciated, however, that in other embodiments the carrier arm 112 may extend rearward from the radially outer wall 110. The seal carrier 66 is secured to the turbine stator 62 at a carrier flange 114 extending radially outwardly from the carrier arm 112. It is to be appreciated, however, that in other embodiments the carrier flange 114 may radially inwardly from the carrier arm 112. Such connection between the turbine stator 62 and the carrier flange 114 may be via one or more fastener openings 116 in the carrier flange 114 as shown in the perspective view of FIG. 4. Alternatively or additionally, a snap connection may be utilized to connect the turbine stator 62 and the carrier flange 114. In some embodiments, the seal carrier 66, including the aft wall 88, the radially outer wall 110, the carrier arm 112 and the carrier flange 114 is formed as a single unitary component. In some embodiments, such as shown in FIG. 2, the carrier arm 112 extends angularly at an arm angle 118 from the radially outer wall 110 at, for example, an angle between 10 degrees and 45 degrees. It is to be appreciated that in other embodiments other angles may be utilized. For example, the arm angle 118 may be between −45 degrees and 45 degrees.

The carrier arm 112 extends away from the primary seal 68 such that the hydrostatic seal 60 is cantilevered from the turbine stator 62, thus resulting in a seal carrier 66 having increased compliance. The carrier arm 112 adds flexibility to the hydrostatic seal 60 such that the difference in thermal growth between the turbine stator 62 having relatively slow thermal growth and the hydrostatic seal 60 having relatively fast thermal growth is accommodated. Thermal stresses and loads on the hydrostatic seal 60, and specifically on the seal carrier 66 die out along the carrier arm 112.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal assembly, comprising:
a primary seal assembly configured to maintain a selected gap between the primary seal and a rotating component; and
a seal carrier including:
a radial outer wall;
an axial wall extending from the radial outer wall at a first axial end of the radial outer wall; and
a carrier arm extending from the radial outer wall at a second axial end of the radial outer wall opposite the first axial end, the carrier arm secured to a static structure for sealing between the rotating component and the static structure;
wherein the carrier arm extends from the radial outer wall at an angle of between 10 degrees and 45 degrees.

2. The hydrostatic seal of claim 1, wherein the radial outer wall, the axial wall and the carrier arm are formed as a single unitary component.

3. The hydrostatic seal of claim 1, further comprising a carrier flange extending from the carrier arm, the seal carrier secured to the static structure via the carrier flange.

4. The hydrostatic seal of claim 3, wherein the carrier flange extends radially outwardly from the carrier arm.

5. The hydrostatic seal of claim 3, wherein the carrier flange is secured to the static structure via one of a bolted or snap connection.

6. The hydrostatic seal of claim 1, wherein the carrier arm extends axially forward of the primary seal.

7. A turbine section of a gas turbine engine, comprising:
a turbine stator;
a turbine rotor configured to rotate about an engine central longitudinal axis relative to the turbine stator; and
a hydrostatic seal assembly fixed to the turbine stator comprising:

a primary seal assembly configured to maintain a selected gap between the primary seal and the turbine rotor; and a seal carrier including:
- a radial outer wall;
- an axial wall extending from the radial outer wall at a first axial end of the radial outer wall; and
- a carrier arm extending from the radial outer wall at a second axial end of the radial outer wall opposite the first axial end, the carrier arm secured to the turbine stator for sealing between the turbine rotor and the turbine stator;
- wherein the carrier arm extends from the radial outer wall at an angle of between 10 degrees and 45 degrees.

8. The turbine section of claim 7, wherein the radial outer wall, the axial wall and the carrier arm are formed as a single unitary component.

9. The turbine section of claim 7, further comprising a carrier flange extending from the carrier arm, the seal carrier secured to the turbine stator via the carrier flange.

10. The turbine section of claim 9, wherein the carrier flange extends radially outwardly from the carrier arm.

11. The turbine section of claim 9, wherein the carrier flange is secured to the turbine stator via one of a bolted or snap connection.

12. The turbine section of claim 7, wherein the carrier arm extends axially forward of the primary seal.

13. A gas turbine engine, comprising:
- a combustor;
- a turbine section in fluid communication with the combustor, the turbine section comprising:
  - a turbine stator;
  - a turbine rotor configured to rotate about an engine central longitudinal axis relative to the turbine stator; and
  - a hydrostatic seal assembly fixed to the turbine stator comprising:
    - a primary seal assembly configured to maintain a selected gap between the primary seal and the turbine rotor; and
    - a seal carrier including:
      - a radial outer wall;
    - an axial wall extending from the radial outer wall at a first axial end of the radial outer wall; and
    - a carrier arm extending from the radial outer wall at a second axial end of the radial outer wall opposite the first axial end, the carrier arm secured to the turbine stator for sealing between the turbine rotor and the turbine stator;
    - wherein the carrier arm extends from the radial outer wall at an angle of between 10 degrees and 45 degrees.

14. The gas turbine engine of claim 13, further comprising a carrier flange extending from the carrier arm, the seal carrier secured to the turbine stator via the carrier flange.

15. The gas turbine engine of claim 14, wherein the carrier flange extends radially outwardly from the carrier arm.

16. The gas turbine engine of claim 14, wherein the carrier flange is secured to the turbine stator via one of a bolted or snap connection.

17. The gas turbine engine of claim 13, wherein the carrier arm extends axially forward of the primary seal.

* * * * *